(12) United States Patent
Hörger et al.

(10) Patent No.: US 7,183,752 B2
(45) Date of Patent: Feb. 27, 2007

(54) CONNECTION METHOD FOR A STATIC VAR COMPENSATOR

(75) Inventors: Wolfgang Hörger, Hausen (DE); Wolfgang Meusel, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/566,308

(22) PCT Filed: Jul. 5, 2004

(86) PCT No.: PCT/EP2004/007336

§ 371 (c)(1), (2), (4) Date: Jan. 27, 2006

(87) PCT Pub. No.: WO2005/020403

PCT Pub. Date: Mar. 13, 2005

(65) Prior Publication Data

US 2006/0152089 A1 Jul. 13, 2006

(51) Int. Cl.
*G05F 1/70* (2006.01)
(52) U.S. Cl. ............ 323/211; 323/210
(58) Field of Classification Search ......... 323/205, 323/208, 209, 210, 211
See application file for complete search history.

(56) References Cited

U.S. PATENT DOCUMENTS

| 4,234,843 | A | * | 11/1980 | Gyugyi et al. ......... 323/210 |
| 4,571,535 | A | * | 2/1986 | Gyugyi .............. 323/211 |
| 4,621,198 | A | * | 11/1986 | Roberge et al. ........ 307/82 |
| 4,638,238 | A | * | 1/1987 | Gyugyi et al. ........ 323/211 |
| 5,963,021 | A | | 10/1999 | Rostron et al. ........ 323/210 |
| 5,969,509 | A | * | 10/1999 | Thorvaldsson ........ 323/210 |
| 5,995,394 | A | * | 11/1999 | Svensson et al. ...... 363/51 |
| 6,255,806 | B1 | * | 7/2001 | Seppanen et al. ..... 323/210 |
| 6,356,422 | B1 | * | 3/2002 | Bilac et al. .......... 361/93.1 |

FOREIGN PATENT DOCUMENTS

| DE | 199 39 709 A1 | 8/1999 |
| EP | 0856 930 A2 | 1/1998 |
| EP | 0 911 951 A1 | 10/1998 |
| WO | WO 99/63640 | 5/1999 |

OTHER PUBLICATIONS

International Search Report; PCT/EP2004/007336; 6 Pgs, Oct. 22, 2004.
Maffrand C. et al.: "Binary Controlled Static VAR Compensator; Based on Electronically Switched Capacitors"; Pesc 1998; Record of the 29th Annual IEEE Power Electronics Specialists Conference; Fukuoka; Pesc. Annual Power Electronics Specialists Conference, New York; IEEE, US, Bd. vol. 2, pp. 1392-1396, XP001004319, May 1998.
International Search Report; PCT/EP2004/007336; 7 Pgs, Nov. 12, 2004.
International Written Opinion; PCT/EP2004/007336; 4 Pgs, Nov. 2004.

* cited by examiner

*Primary Examiner*—Jeffrey Sterrett
(74) *Attorney, Agent, or Firm*—Baker Botts L.L.P.

(57) ABSTRACT

A static VAR compensator has several parallel compensation components (K1–K3). To connect the static VAR compensator to an operating voltage (U) the compensation components (K1–K3) are first successively connected to the operating voltage (U) by a control unit (CU) via a series resistor (R). The compensation components (K1–K3) are only connected to the operating voltage (U) without series resistance once the aforementioned connection has been completed.

19 Claims, 4 Drawing Sheets

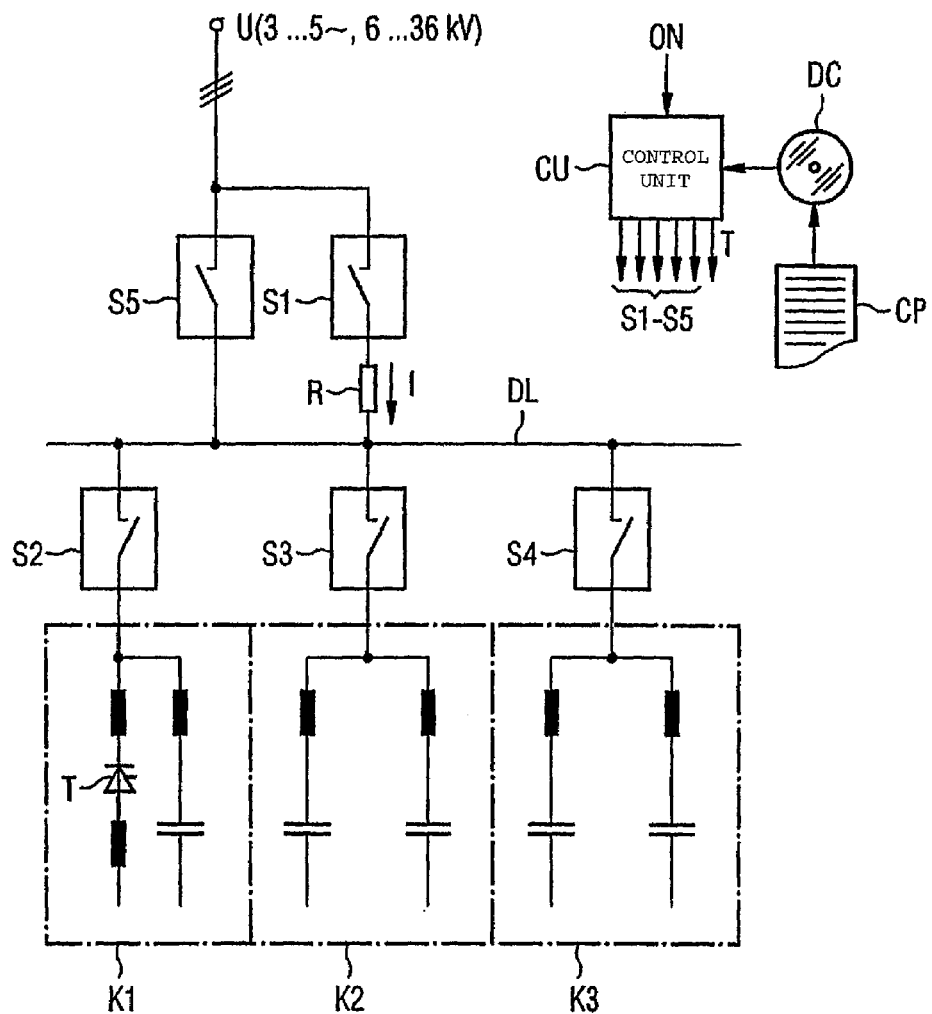

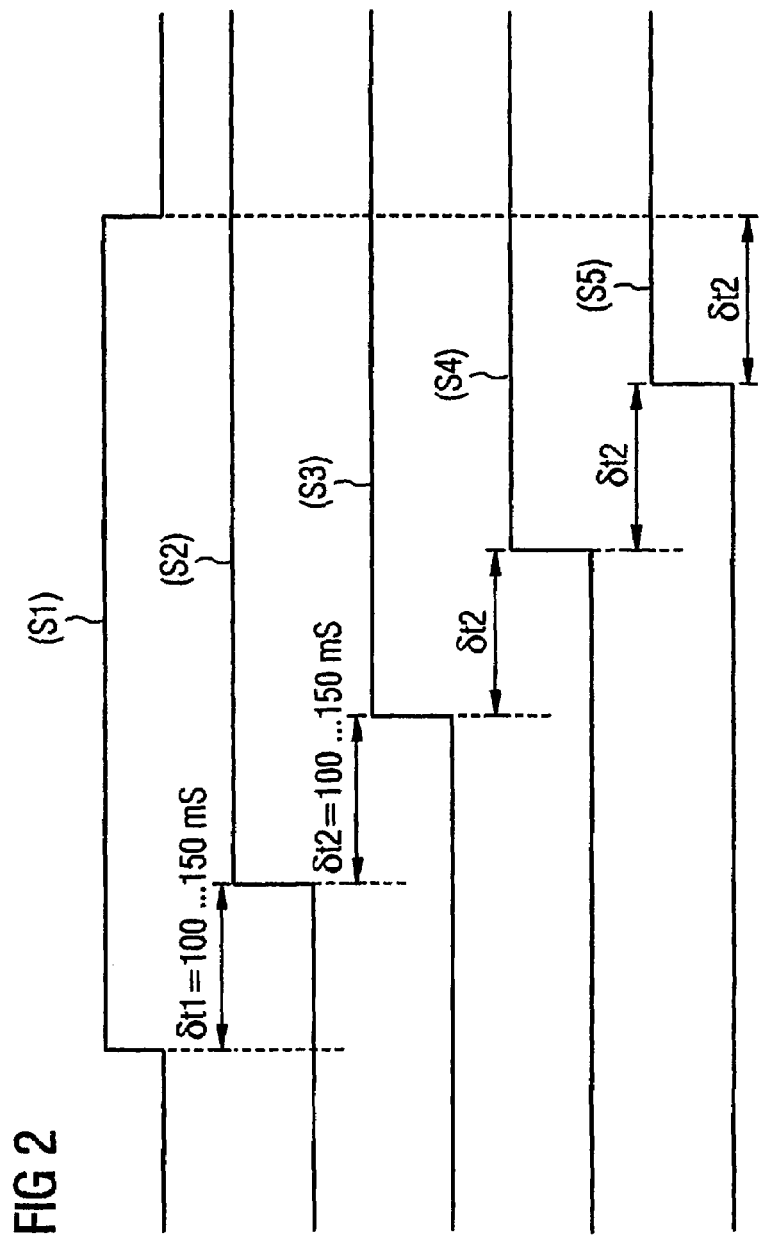

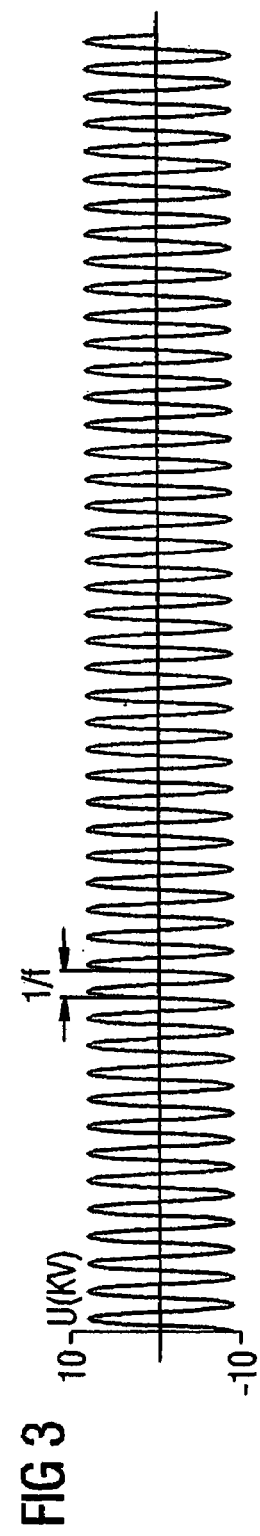
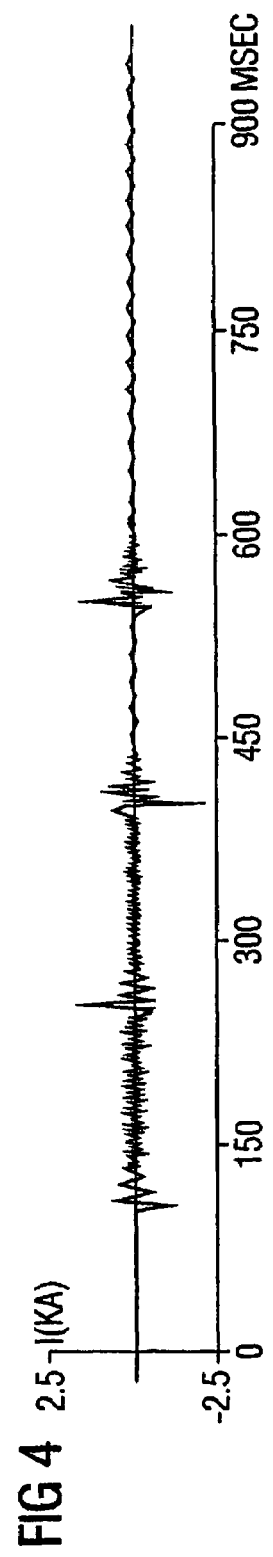

CONNECTION METHOD FOR A STATIC VAR COMPENSATOR

CROSS-REFERENCE TO RELATED APPLICATIONS

This application is a U.S. national stage application of International Application No. PCT/EP2004/007336 filed Jul. 5, 2004, which designates the United States of America, and claims priority to German application number DE 03017299.3 filed Jul. 30, 2003, the contents of which are hereby incorporated by reference in their entirety.

TECHNICAL FIELD

The present invention relates to a method for connecting a static VAR (VAR=Volt Ampere Reactive) compensator having a plurality of parallel compensation components to an operating voltage.

BACKGROUND

It furthermore relates to a control program stored on a data carrier, a control unit for a static VAR compensator and a static VAR compensator which are designed for implementing such a connection method.

Reactive power compensators—so-called SVC (SVC=static VAR compensator) systems—usually comprise a TCR (TCR=thyristor controlled reactance) and at least one filter circuit. They are used for large consumers that are fed alternating current from an AC voltage network, and serve to compensate the reactive power components of the alternating current.

It is usually possible to connect the static VAR compensator to the AC voltage network (or more generally the operating voltage), and to disconnect it from the network again. Transient disturbances in the operating voltage and/or in the flowing currents can arise when the static VAR compensator is connected. In extreme cases, this can cause another system that is likewise being supplied with the operating voltage to perform an emergency shutdown. This results in production stoppages or other operating interruptions.

To avoid such operating interruptions, in the prior art the static VAR compensator is only connected to the operating voltage when other systems or system components that are also supplied via the operating voltage and whose interruption-free operation must be ensured are not currently in operation. This however not only restricts flexibility when connecting the static VAR compensator to the operating voltage. In practice, implementation of this method is additionally only possible with a great deal of effort.

In polyphase AC voltage networks, it is furthermore known to connect the individual phases of the AC voltage network successively to the static VAR compensator with a defined time offset to the voltage zero of the respective phase. This requires special, costly switching devices however.

SUMMARY

The object of the present invention is to provide a connection method for a static VAR compensator which avoids an unacceptably great effect on the operating voltage and which is simpler to implement than the aforementioned prior art connection method.

The object is achieved for the connection method in that the compensation components are first successively connected by a control unit to the operating voltage via a series resistor and are then connected to the operating voltage without a series resistor.

For the control program, the control unit and the static VAR compensator, the object is achieved in that they are designed to implement the connection method according to the invention.

As a result, therefore, the entire static VAR compensator is not connected to the operating voltage at the same time. Rather, the connection of the compensation components to the operating voltage is performed staggered over time and is damped by virtue of the series resistor. The static VAR compensator is only connected to the operating voltage without a series resistor once the aforementioned connection has been completed.

If the compensation component which is first connected to the operating voltage via the series resistor is an active component with at least one controllable reactive power element, e.g. has a TCR, active control of the current flowing across the series resistor is possible from the outset. In particular this can be utilized so that a current having the fundamental frequency of the AC voltage which flows across the series resistor is essentially compensated.

The compensation circuits connected to the operating voltage via the series resistor after the first compensation component are usually purely passive filter circuits.

If, following connection of the compensation components to the operating voltage without a series resistor, the series resistor is disconnected from the operating voltage by the control unit, any enduring current flow across the series resistor is prevented. This is especially advantageous because whenever the static VAR compensator is subsequently disconnected from the operating voltage, this disconnection can be performed without regard for the series resistor.

The connection without a series resistor is particularly simple to implement if the connection of the compensation components to the operating voltage without a series resistor is performed simultaneously for all compensation components.

The connection method according to the invention is particularly effective if a time offset between the connection of two compensation components connected to the operating voltage immediately in succession via the series resistor is between 50 and 300 ms. This enables a good compromise between a low-effect connection of the entire static VAR compensator and the ability to react quickly to an event which requires the static VAR compensator to be connected. The time offset here should preferably be between 80 and 200 ms, e.g. 100 to 150 ms.

To implement the connection method according to the invention, in order to connect the compensation components to the operating voltage, it is for example possible to connect a distribution bus upstream of the compensation components to the operating voltage via the series resistor and to connect the compensation components to the distribution bus. For the subsequent connection of the compensation components to the operating voltage without a series resistor, in this case in particular it is possible simply to connect the distribution bus to the operating voltage without a series resistor.

The first compensation component is preferably connected to the distribution bus only after a time delay following the connection of the distribution bus to the operating voltage via the series resistor.

The time delay can have the same values as the time offset.

In a frequent application, the operating voltage is a high voltage, in particular a medium voltage of between 6 and 36 kV.

The connection method according to the invention can be implemented in a particularly simple manner if the operating voltage has a plurality of phases and the phases are connected simultaneously to the compensation components by the control unit.

BRIEF DESCRIPTION OF THE DRAWINGS

Further advantages and details emerge from the description of an exemplary embodiment below in conjunction with the drawings. In a basic diagram in each case, FIG. 1 shows a block circuit diagram of a static VAR compensator, FIG. 2 shows a timing diagram, FIG. 3 shows a voltage waveform, FIG. 4 shows a current waveform.

DETAILED DESCRIPTION

Figure 5:
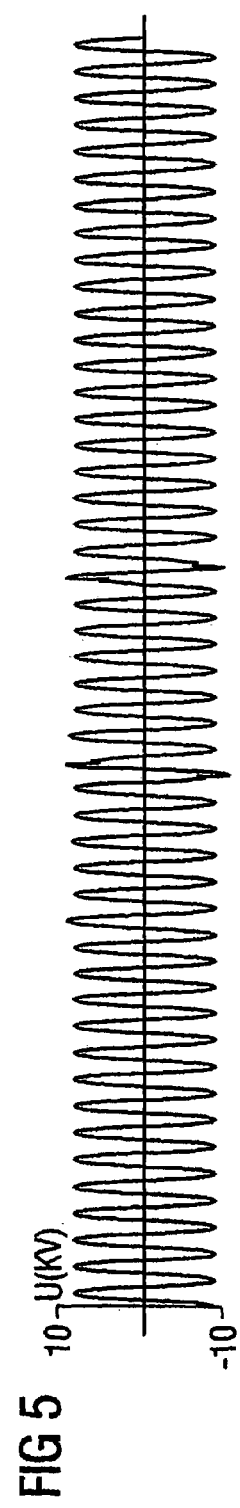
FIG. 5 shows a voltage waveform.

According to FIG. 1, a static VAR compensator has a plurality of compensation components K1 to K3. The compensation components K1 to K3 are arranged in parallel with one another relative to a distribution bus DL. According to FIG. 1, three compensation components K1 to K3 are present. It would however also be possible for more or fewer compensation components K1 to K3 to be present. There should be no fewer than two compensation components K1 to K3 however.

The compensation component K1 is an active component with at least one controllable reactive power element. According to FIG. 1, the controllable reactive power element is designed as a TCR here. It therefore has a thyristor unit T, by means of which the reactance of the compensation component K1 can be controlled. In addition, according to FIG. 1 the compensation component K1 also has a purely passive filter circuit. This is not absolutely necessary however. The other compensation components K2 and K3 are purely passive filter circuits.

The compensation components K1 to K3 can be connected to an operating voltage U via switches S1 to S5 and a series resistor R. The operating voltage U is usually a high voltage, e.g. a medium voltage of between 6 and 36 kV. It is generally a three-phase alternating current system. In individual cases however, it may also be an alternating current system with more than three phases, e.g. an alternating current system with four or five phases. It may however also be a single-phase voltage system.

The static VAR compensator furthermore has a control unit CU which controls the switches S1 to S5 and the thyristor unit T. The control unit CU is here a programmable control unit CU which executes a control program CP. In this arrangement the control program CP is supplied to the control unit CU via a data carrier DC on which the control program CP is stored in (solely) machine-readable form.

As a result of the programming with the control program CP, the control unit CU connects the compensation components K1 to K3 of the static VAR compensator to the operating voltage U in the following manner, which is explained in greater detail with reference to FIG. 2.

When a connection command ON is supplied to the control unit CU, the control unit CU first immediately closes the switch S1. The distribution bus DL is therefore first connected to the operating voltage U.

It is also possible to close the switch S2 simultaneously. If necessary, the switch S2 can even be dispensed with. According to FIG. 2, however, the control unit CU closes the switch S2 only after a time delay δt1. After a time offset δt2 has elapsed in each case, the control unit CU then closes the switches S3 and S4. All compensation components K1 to K3 are thus connected to the operating voltage U via the series resistor R.

Following the elapse of the time offset δt2 once more, the control unit CU closes the switch S5. After the switch S5 closes, the control unit CU waits again for the time offset δt2 and then opens the switch S1.

The time delay δt1 is preferably between 50 and 300 ms, in particular between 80 and 200 ms. According to FIG. 2, it is 100 to 150 ms for example. The time offset δt2 is preferably between 50 and 300 ms, in particular between 80 and 200 ms. According to FIG. 2, it is also 100 to 150 ms for example.

In particular, the time delay 5 μl and the time offset δt2 may have the same value.

As can be seen from FIG. 3 for one of the phases of the operating voltage U, the operating voltage U has a fundamental frequency f. According to FIG. 1, the control unit CU not only controls the switches S1 to S5, but also the thyristor unit T. The thyristor unit T, and consequently the active component K1, is controlled by the control unit CU here in such a way that a current I flowing across the series resistor R is essentially compensated, provided it has the fundamental frequency f. The thyristor unit T is therefore controlled depending on the control commands output to the switches S1 to S5. This can be seen clearly in FIG. 4.

Figure 6:
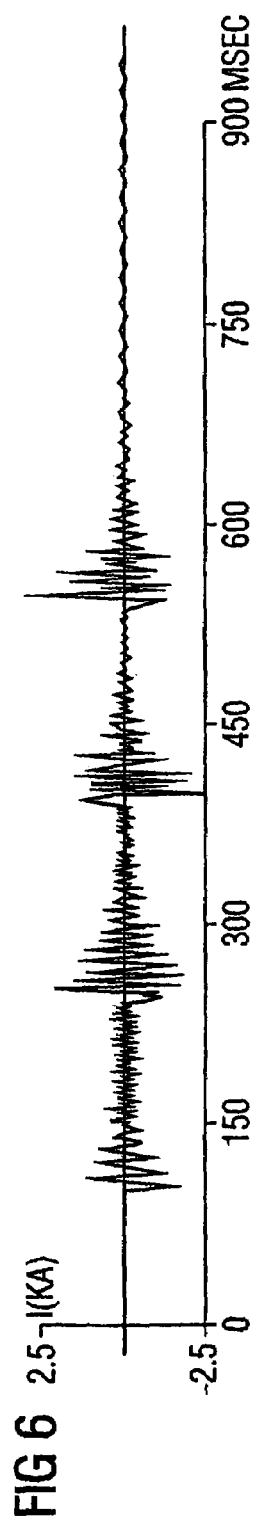
FIG. 6 shows a current waveform.

Using the connection method according to the invention, it is possible to achieve a considerably lesser effect on the network than with the conventional prior art connection methods. This holds true despite the fact that all phases of the switches S1 to S5 are switched simultaneously with the solution according to the invention. The advantages of the connection method according to the invention in comparison with the conventional connection methods of the prior art are particularly evident when FIG. 3 is compared with FIG. 5 and FIG. 4 is compared with FIG. 6. FIGS. 5 and 6 namely show a voltage and a current waveform that occur with a conventional prior art connection method. It is clear that the conventional prior art has a far greater effect on the network than the connection method according to the invention.

The invention claimed is:

1. A method for connecting a static VAR compensator having a plurality of parallel compensation components to an operating voltage, the method comprising the steps of:

successively connecting the compensation components by a control unit first to the operating voltage via a series resistor and then to the operating voltage without a series resistor, wherein an active component with at least one controllable reactive power element is used as the compensation component which is first connected to the operating voltage via the series resistor.

2. A connection method according to claim 1, wherein the operating voltage is an AC voltage with a fundamental frequency, and wherein the active component is controlled by the control unit in such a way that a current having the fundamental frequency which flows across the series resistor is essentially compensated.

3. A connection method according to claim 1, wherein the compensation components connected to the operating voltage via the series resistor after the first compensation component are filter circuits.

4. A connection method according to claim 1, wherein, following connection of the compensation components to the operating voltage without a series resistor, the series resistor is disconnected from the operating voltage by the control unit.

5. A connection method according to claim 1, wherein the connection of the compensation components to the operating voltage without a series resistor is performed simultaneously for all compensation components.

6. A connection method according to claim 1, wherein a time offset between the connection of two compensation components connected to the operating voltage immediately in succession via the series resistor is between 50 and 300 ms.

7. A connection method according to claim 6 wherein the first compensation component is connected to the distribution bus only after a time delay following the connection of the distribution bus to the operating voltage via the series resistor and wherein the time delay is the same as the time offset.

8. A connection method according to claim 1, wherein, in order to connect the compensation components to the operating voltage, a distribution bus upstream of the compensation components is connected to the operating voltage via the series resistor and the compensation components are connected to the distribution bus.

9. A connection method according to claim 8, wherein the first compensation component is connected to the distribution bus only after a time delay following the connection of the distribution bus to the operating voltage via the series resistor.

10. A connection method according to claim 9, wherein the time delay is between 50 and 300 ms.

11. A connection method according to claim 9, wherein the time delay is between 80 and 200 ms or between 100 to 150 ms.

12. A connection method according to claim 8, wherein for the connection of the compensation components to the operating voltage without a series resistor, the distribution bus is connected to the operating voltage without a series resistor.

13. A connection method according to claim 1, wherein an operating voltage having a plurality of phases is applied and in that the phases are connected simultaneously to the compensation components by the control unit.

14. A control program stored on a data carrier being executable on a computer for implementing a connection method as claimed in claim 1.

15. A control unit for a static VAR compensator operable to execute a method as claimed in claim 1.

16. A static VAR compensator operable for executing a method as claimed in claim 1.

17. A connection method according to claim 1, wherein the controllable reactive power element is a thyrisor controlled reactance (TCR).

18. A connection method according to claim 1, wherein a time offset between the connection of two compensation components connected to the operating voltage immediately in succession via the series resistor is between 80 and 200 ms or between 100 to 150 ms.

19. A connection method according to claim 1, wherein the operating voltage is a high voltage between 6 and 36 kV.

* * * * *